United States Patent
Tsubata

(10) Patent No.: US 11,774,984 B2
(45) Date of Patent: Oct. 3, 2023

(54) AIRCRAFT AND FLIGHT CONTROLLER FOR AIRCRAFT

(71) Applicant: SUBARU CORPORATION, Tokyo (JP)

(72) Inventor: Hiroyuki Tsubata, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 339 days.

(21) Appl. No.: 17/138,894

(22) Filed: Dec. 31, 2020

(65) Prior Publication Data

US 2021/0271265 A1  Sep. 2, 2021

(30) Foreign Application Priority Data

Feb. 28, 2020  (JP) .................................. 2020-033177

(51) Int. Cl.
*B64C 19/00* (2006.01)
*G05D 1/08* (2006.01)
(Continued)

(52) U.S. Cl.
CPC ........... *G05D 1/0808* (2013.01); *B64C 19/00* (2013.01); *G01V 3/088* (2013.01); *G08G 5/003* (2013.01)

(58) Field of Classification Search
CPC ...... G05D 1/0808; B64C 19/00; G01V 3/088; G08G 5/003
(Continued)

(56) References Cited

U.S. PATENT DOCUMENTS 9,824,597 B2 * 11/2017 Sekelsky ................ G05D 1/042
10,118,696 B1 * 11/2018 Hoffberg ............... B64C 39/001
(Continued)

FOREIGN PATENT DOCUMENTS

CN  107608386 A  *  1/2018  ............... G05D 1/08
EP  3871983 A1  *  1/2021  ............. B64D 45/02
(Continued)

OTHER PUBLICATIONS

D.M. Mach et al., "General Matrix Inversion Technique for the Calibration of Electric Filed Sensor Arrays on Aircraft Platforms", Journal of Atmospheric and Oceanic Technology, Sep. 1, 2007.
(Continued)

*Primary Examiner* — Daniel L Greene
*Assistant Examiner* — Robert Louis Pinkerton
(74) *Attorney, Agent, or Firm* — McDermott Will & Emery LLP

(57) ABSTRACT

An aircraft includes a fuselage, a main wing, an electric field sensor, and a flight controller. The electric field sensor is configured to detect surface electric field intensities at four or more of mutually different positions on the aircraft. The flight controller includes a storage, a data extracting unit, an electric field intensity calculator, and an attitude control unit. The storage holds an electric field distribution table. The data extracting unit is configured to extract one of pieces of distribution data from the electric field distribution table. The electric field intensity calculator is configured to calculate surface electric field intensities at respective positions on the basis of the extracted piece of the distribution data. The attitude control unit is configured to perform prevention operation of the aircraft on the basis of the calculated surface electric field intensities at the respective positions.

7 Claims, 9 Drawing Sheets

(51) Int. Cl.
*G01V 3/08* (2006.01)
*G08G 5/00* (2006.01)
*B64D 45/02* (2006.01)

(58) Field of Classification Search
USPC .............................................................. 701/3
See application file for complete search history.

(56) References Cited

U.S. PATENT DOCUMENTS

| | | | |
|---|---|---|---|
| 10,450,086 B2* | 10/2019 | Martinez-Sanchez | ....................... B64D 45/02 |
| 10,819,035 B2* | 10/2020 | Wolniansky | ........... H01Q 13/10 |
| 2003/0093187 A1* | 5/2003 | Walker | ............... B64D 45/0059 701/1 |
| 2013/0062457 A1* | 3/2013 | Deakin | .................... B64B 1/10 343/706 |
| 2016/0356601 A1* | 12/2016 | Lescourret | ........... G01C 21/165 |
| 2019/0049500 A1* | 2/2019 | Subramania | ........... B64D 45/02 |
| 2019/0154439 A1* | 5/2019 | Binder | .................. G01B 11/26 |
| 2019/0353975 A1* | 11/2019 | DiDomenico | ........... G02B 3/14 |
| 2020/0039814 A1* | 2/2020 | Tanaka | .................. G01P 15/125 |
| 2020/0174052 A1* | 6/2020 | Homma | .................. G01S 13/32 |
| 2020/0294401 A1* | 9/2020 | Kerecsen | ............. G05D 1/0287 |

FOREIGN PATENT DOCUMENTS

| | | | |
|---|---|---|---|
| EP | 3 871 983 A1 | 9/2021 | |
| JP | 04-071197 A | 3/1992 | |
| JP | H-0648639 B2 * | 5/1992 | ............... H05F 3/04 |

OTHER PUBLICATIONS

Extended European Search Report issued in corresponding European Patent Application No. 21153431.8-1010, dated Jul. 2, 2021.
European Office Action issued in corresponding European Patent Application No. 21153431.8-1004, dated Dec. 21, 2022.

* cited by examiner

| SAMPLE | REFERENCE SURFACE ELECTRIC FIELD INTENSITY ||||||||||||| ELECTRIC FIELD DIRECTION ||
| | 30a | 30b | 30c | 30d | 30e | 30f | 30g | 30h | 30i | 30j | 30k | 30l | 30m | AZI-MUTH | ELE-VATION |
|---|---|---|---|---|---|---|---|---|---|---|---|---|---|---|---|
| 1 | A1 | B1 | C1 | D1 | E1 | F1 | G1 | H1 | I1 | J1 | K1 | L1 | M1 | AZ1 | EL1 |
| 2 | A2 | B2 | C2 | D2 | E2 | F2 | G2 | H2 | I2 | J2 | K2 | L2 | M2 | AZ2 | EL2 |
| 3 | A3 | B3 | C3 | D3 | E3 | F3 | G3 | H3 | I3 | J3 | K3 | L3 | M3 | AZ3 | EL3 |
| ... | ... | ... | ... | ... | ... | ... | ... | ... | ... | ... | ... | ... | ... | ... | ... |

FIG. 5

AIRCRAFT AND FLIGHT CONTROLLER FOR AIRCRAFT

CROSS-REFERENCE TO RELATED APPLICATIONS

The present application claims priority from Japanese Patent Application No. 2020-033177 filed on Feb. 28, 2020, the entire contents of which are hereby incorporated by reference.

BACKGROUND

The technology relates to an aircraft and a flight controller for the aircraft that control an attitude of an airframe of the aircraft during its flight.

A technique is known that prevents lightning strike by means of ion emission. For example, Japanese Unexamined Patent Application Publication No. H04-071197 discloses a lightning strike prevention apparatus that prevents direct strike of lightning on the ground by forming an ion cloud. The lightning strike prevention apparatus forms the ion cloud by generating corona discharge to attach ions to a mist and emitting the ions from the ground.

SUMMARY

An aspect of the technology provides an aircraft that includes a fuselage, a main wing, an electric field sensor, and a flight controller. The main wing is attached to the fuselage and is configured to generate lift that acts on the aircraft. The electric field sensor is configured to detect surface electric field intensities at four or more of mutually different positions on the aircraft. The flight controller includes a storage, a data extracting unit, an electric field intensity calculator, and an attitude control unit. The storage holds an electric field distribution table in which two or more samples are associated with two or more respective pieces of distribution data. The samples each correspond to one of external electric fields having mutually different directions. The pieces of distribution data each include data on a distribution of reference surface electric field intensities at the respective positions on the aircraft in a case where the aircraft receives the external electric field of corresponding one of the samples. The data extracting unit is configured to extract one of the pieces of distribution data from the electric field distribution table on the basis of a result of detection performed by the electric field sensor. The electric field intensity calculator is configured to calculate surface electric field intensities at the respective positions on the basis of the extracted piece of the distribution data. The attitude control unit is configured to perform prevention operation of the aircraft on the basis of the calculated surface electric field intensities at the respective positions.

An aspect of the technology provides a flight controller for an aircraft. The flight controller includes a storage, a data extracting unit, an electric field intensity calculator, and an attitude control unit. The storage holds an electric field distribution table in which two or more samples are associated with two or more respective pieces of distribution data. The samples each correspond to one of external electric fields having mutually different directions. The pieces of distribution data each include data on a distribution of reference surface electric field intensities at mutually different positions on an aircraft in a case where the aircraft receives the external electric field of corresponding one of the samples. The data extracting unit is configured to extract one of the pieces of distribution data from the electric field distribution table on the basis of a result of detection performed by an electric field sensor. The electric field sensor is configured to detect surface electric field intensities at four or more of the positions on the aircraft. The electric field intensity calculator is configured to calculate surface electric field intensities at the respective positions on the basis of the extracted piece of the distribution data. The attitude control unit is configured to perform prevention operation of the aircraft on the basis of the calculated surface electric field intensities at the respective positions.

An aspect of the technology provides an aircraft that includes a fuselage, a main wing, an electric field sensor, a storage, and circuitry. The main wing is attached to the fuselage and is configured to generate lift that acts on the aircraft. The electric field sensor is configured to detect surface electric field intensities at four or more of mutually different positions on the aircraft. The storage holds an electric field distribution table in which two or more samples are associated with two or more respective pieces of distribution data. The samples each correspond to one of external electric fields having mutually different directions. The pieces of distribution data each include data on a distribution of reference surface electric field intensities at the respective positions on the aircraft in a case where the aircraft receives the external electric field of corresponding one of the samples. The circuitry is configured to extract one of the pieces of distribution data from the electric field distribution table on the basis of a result of detection performed by the electric field sensor. The circuitry is configured to calculate surface electric field intensities at the respective positions on the basis of the extracted piece of the distribution data. The circuitry is configured to perform prevention operation of the aircraft on the basis of the calculated surface electric field intensities at the respective positions.

An aspect of the technology provides a flight controller for aircraft. The flight controller includes a storage and circuitry. The storage holds an electric field distribution table in which two or more samples are associated with two or more respective pieces of distribution data. The samples each correspond to one of external electric fields having mutually different directions. The pieces of distribution data each include data on a distribution of reference surface electric field intensities at mutually different positions on an aircraft in a case where the aircraft receives the external electric field of corresponding one of the samples. The circuitry is configured to extract one of the pieces of distribution data from the electric field distribution table on the basis of a result of detection performed by an electric field sensor. The electric field sensor is configured to detect surface electric field intensities at four or more of the positions on the aircraft. The circuitry is configured to calculate surface electric field intensities at the respective positions on the basis of the extracted piece of the distribution data. The circuitry is configured to perform prevention operation of the aircraft on the basis of the calculated surface electric field intensities at the respective positions.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIG. 5 is a diagram illustrating an example of an electric field distribution table.

DETAILED DESCRIPTION

Figure 1:
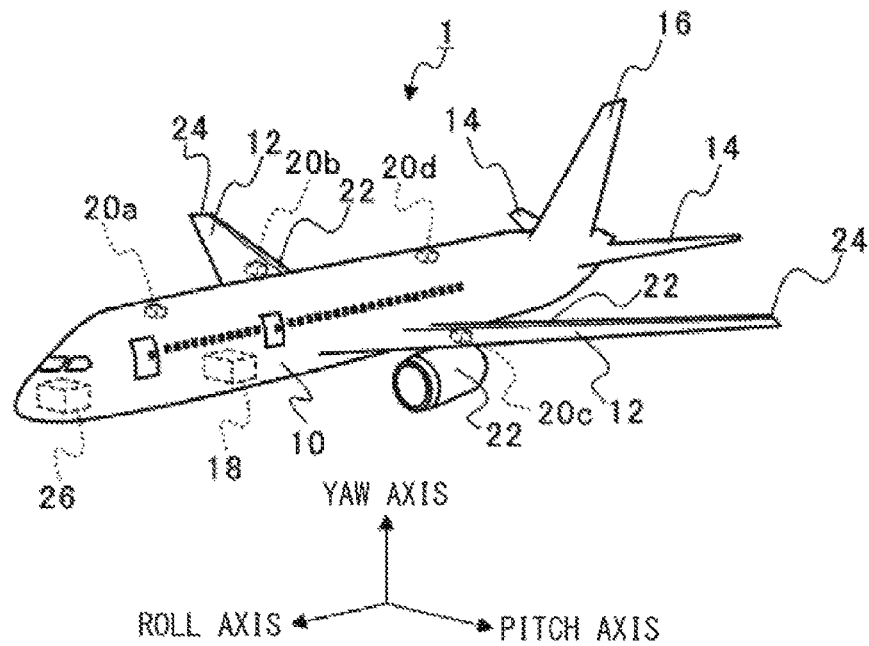
FIG. 1 is a schematic perspective view of an aircraft according to one example embodiment of the technology.

For example, lightning strike is likely to occur at an end of the aircraft such as an end of the tail of the aircraft. To address this, surface electric field intensities at two or more positions on the airframe including the end may be detected to perform lightning strike prevention operation on the basis of a result of the detection. However, an electric field sensor disposed at a position where lightning strike easily occurs can possibly malfunction due to the lightning strike. Further, it can lead to an increase in installation cost or operation cost in a case of providing the electric field sensors at all of the positions that are to be subjected to detection of its surface electric field intensity.

It is desirable to provide an aircraft and a flight controller for aircraft that make it possible to appropriately calculate surface electric field intensities at a low cost.

In the following, some embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

FIG. 1 is a schematic perspective view of an aircraft 1 according to an example embodiment of the technology. Referring to FIG. 1, the aircraft 1 may include a fuselage 10, a main wing 12, electric field sensors 20, and a flight controller 26. The electric field sensors 20 may include electric field sensors 20a, 20b, 20c, and 20d illustrated in FIG. 1. The aircraft 1 may also include a horizontal tail 14, a vertical tail 16, an attitude sensor 18, a flight mechanism 22, and a member displacement mechanism 24. Note that an example embodiment exemplifies a passenger airplane as the aircraft 1; however, any embodiment of the technology is applicable to any of various machines that fly in the air. It is to be also noted that an example embodiment exemplifies the aircraft adapted to automatically control an attitude of an airframe. However, any embodiment of the technology is also applicable to an aircraft adapted to prompt a pilot to fly the aircraft such that a target airframe attitude is attained, by presenting the target airframe attitude to the pilot by means of a device provided in a cockpit, such as a display. In one embodiment, the aircraft 1 may serve as an "aircraft". In one embodiment, the fuselage 10 may serve as a "fuselage". In one embodiment, the main wing 12 may serve as a "main wing". In one embodiment, the flight controller 26 may serve as a "flight controller".

The fuselage 10 may extend in a direction of a roll axis between a nose and a tail of the aircraft 1. The main wing 12, the horizontal tail 14, and the vertical tail 16 may be fixed to the fuselage 10 and contribute to a stable flight of the aircraft 1.

The attitude sensor 18 may be or may include an inertial measurement unit (IMU), for example. The attitude sensor 18 may detect the attitude of the airframe of the aircraft 1. The two or more electric field sensors 20 may each detect a surface electric field intensity at a position where the electric field sensor 20 is disposed. The surface electric field intensity may refer to an intensity of an electric field generated on a surface of the airframe. The positions of the electric field sensors 20 will be described later in detail.

The flight mechanism 22 may include: fixed wings including the main wing 12, the horizontal tail 14, and the vertical tail 16; and an internal combustion engine that achieves thrust. The internal combustion engine may be a jet engine, a reciprocating engine, or any other type of engine. The flight mechanism 22 may keep the airframe floating in the air by generating lift around the wings through the thrust. Note that a mechanism that generates the lift is not limited thereto. A rotatably-provided rotary wing, or a rotor, may be used to achieve the lift and/or the thrust. The flight mechanism 22 may control a nose angle (a pitch angle) and/or a bank angle (a roll angle) by means of an elevator and/or an aileron. The flight mechanism 22 may also control the attitude of the airframe, a direction of flight (a yaw angle), an altitude, and a flight speed by adjusting, for example, an output of the internal combustion engine.

The member displacement mechanism 24 may be configured to displace an ion emission member that emits ions from the airframe. The member displacement mechanism 24 will be described later in detail.

The flight controller 26 may be or may include a semiconductor integrated circuit. The semiconductor integrated circuit may have devices including a central processing unit (CPU), a read-only memory (ROM) that holds programs, etc., and a random-access memory (RAM) that serves as a work area.

Figure 2:
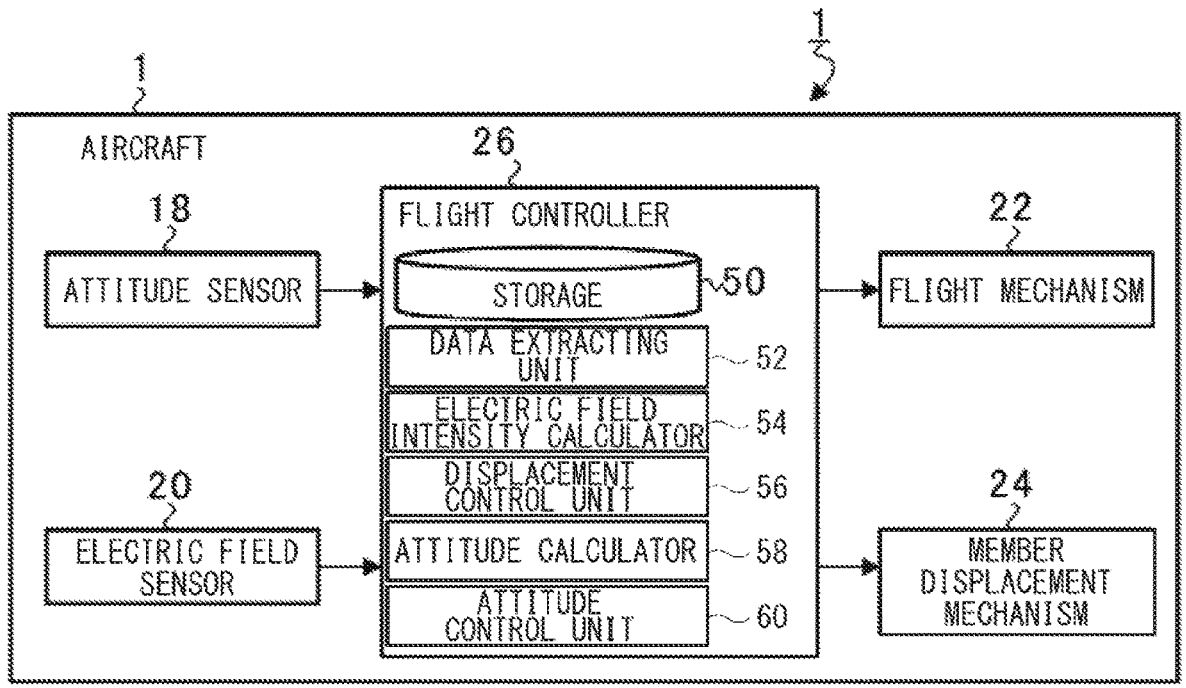
FIG. 2 is a block diagram illustrating an example of a control system of the aircraft.

FIG. 2 is a block diagram illustrating an example of a control system of the aircraft 1. The flight controller 26 may perform various processes on the basis of a result of detection performed by various sensors including the attitude sensor 18 and the electric field sensors 20. The flight controller 26 may receive an input of operation performed by a pilot that flies the aircraft 1, and control the flight mechanism 22 to maintain the flight of the aircraft 1.

The flight controller 26 may also include a storage 50. The storage 50 may include any of devices including a ROM, a RAM, a flash memory, and a hard disk drive (HDD). The storage 50 may hold a program and various types of data such as image data for the flight controller 26 to use. The flight controller 26 may serve as a data extracting unit 52, an electric field intensity calculator 54, a displacement control unit 56, an attitude calculator 58, and an attitude control unit 60, on the basis of cooperation with the program held by the storage 50. Processes which the above-described units perform will be described later in detail. In one embodiment, the storage 50 may serve as a "storage". In one embodiment, the data extracting unit 52 may serve as a "data extracting unit". In one embodiment, the electric field intensity calculator 54 may serve as an "electric field intensity calculator". In one embodiment, the attitude control unit 60 may serve as an "attitude control unit". In one embodiment, the electric field sensors 20 may serve as an "electric field sensor".

Figure 3:
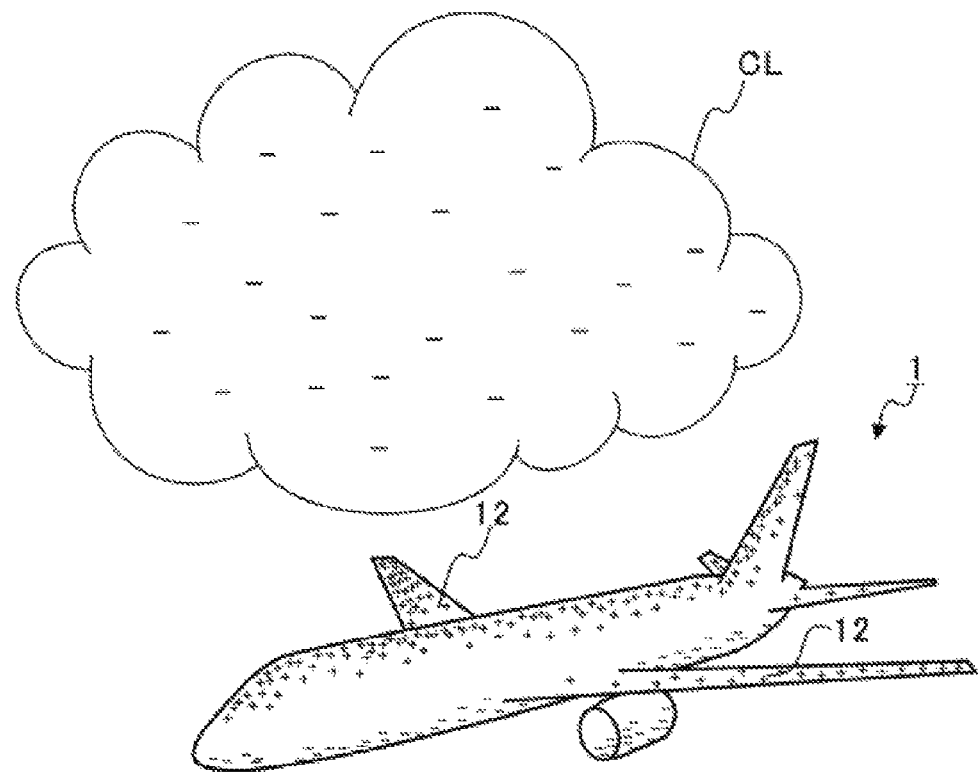
FIG. 3 is a diagram illustrating an example of polarization of electric charges in the aircraft.

FIG. 3 illustrates an example of polarization of electric charges in the aircraft 1. In FIG. 3, "+" and "−" respectively denote positive electric charges and negative electric charges. Referring to FIG. 3, the aircraft 1 flies in the vicinity of a region below a cloud CL which is negatively charged. Due to an electric field caused by the negative electric charges in the cloud CL (electrostatic induction), the upper side of the aircraft 1 is positively polarized whereas a lower side of the aircraft 1 is negatively polarized.

Note that the cloud CL can sometimes be positively charged, and the aircraft 1 can sometimes be interposed between the negatively charged cloud CL and the positively charged cloud CL as well. Accordingly, the electric charges of the aircraft 1 do not necessarily be polarized to be in a state illustrated in FIG. 3.

FIG. 3 illustrates an example in which the cloud CL is positioned on the right side of a region above the aircraft 1. The positive electric charges are thus biased at a right end of the main wing 12 while being polarized on the upper side of the aircraft 1, whereas the negative electric charges are thus biased at a left end of the main wing 12 while being polarized on the lower side of the aircraft 1. Accordingly, a strong electric field generated at a region where the positive electric charges are concentrated causes breakdown in the air, resulting in leakage of the electric charges from a streamer through a leader into the air. Further, the electric charges no longer be able to be held in the cloud CL can travel toward the region in which the positive electric charges are biased. This can result in coupling of a leader from the cloud CL and a leader extending from the airframe and result in electric discharge, which in turn can lead to generation of lightning strike on the aircraft 1 consequently.

As described above, lightning strike is likely to occur at an end of the aircraft such as an end of the tail of the aircraft. To address this, surface electric field intensities at two or more positions on the airframe including such an end may be detected to perform lightning strike prevention operation on the basis of a result of the detection. However, the electric field sensor 20 disposed at a position where lightning strike easily occurs can possibly malfunction due to the lightning strike. Further, it can result in an increase in installation cost or operation cost to provide the electric field sensors 20 at all of the positions that are to be subjected to surface electric field intensity detection.

As described with reference to FIG. 3, the bias in the positive electric charges and the negative electric charges in the aircraft 1 is largely influenced by a direction of an external electric field (hereinafter simply referred to as an "electric field direction") around the aircraft 1. Specifically, the electric field having a predetermined direction is formed in the air by the cloud CL, and the positive electric charges and the negative electric charges are biased as illustrated in FIG. 3 when the aircraft 1 flies through the electric field.

Such an external electric field and the polarization of electric charges in the airframe are correlated to each other, and are both reproducible. Accordingly, in an external electric field having a certain electric field direction, an identical aircraft 1 may have an identical distribution of surface electric field intensities. In one example, an electric field distribution table may be prepared in advance as a reference, and a distribution of surface electric field intensities at a plurality of positions on the airframe may be calculated on the basis of the prepared electric field distribution table and a result of detection performed by a small number of electric field sensors 20. Distribution data of the calculated surface electric field intensities may be used to reduce an influence of the lightning strike. Described in the following is an example of a process of calculating the distribution data of the surface electric field intensities.

Figure 4:
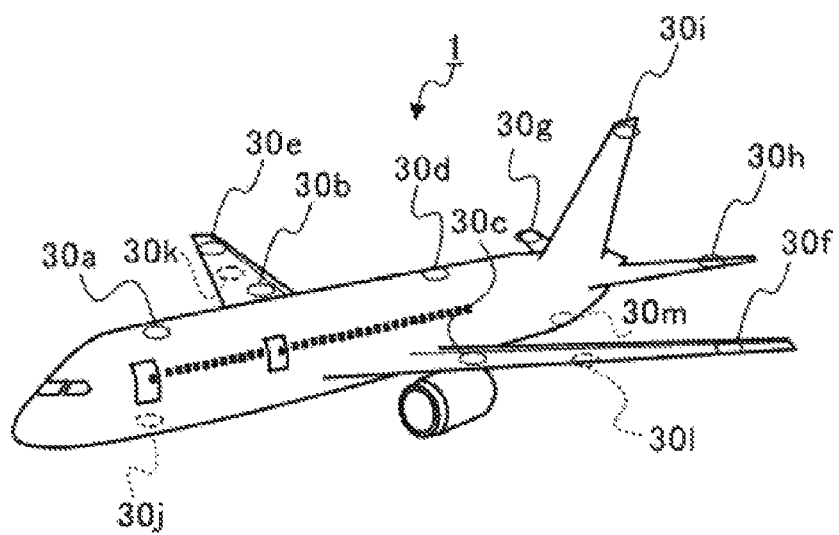
FIG. 4 is a diagram illustrating an example of reference positions for surface electric field intensities on the aircraft.

FIG. 4 illustrates an example of reference positions for the surface electric field intensities of the aircraft 1. FIG. 5 illustrates an example of an electric field distribution table. Described in the following is an example to generate the electric field distribution table by simulation.

First, a simulation may be carried out of a flight of the aircraft 1 in an external electric field having an already known electric field direction. A calculation may be carried out of surface electric field intensities at mutually different positions on the aircraft 1 in a case where the aircraft 1 receives the already known external electric field. In this example, the mutually different positions are thirteen positions 30a, 30b, 30c, 30d, 30e, 30f, 30g, 30h, 30i, 30j, 30k, 30l, and 30m. Among the thirteen positions, the positions 30a, 30b, 30c, 30d, 30e, 30f, 30g, 30h, and 30i correspond to an upper surface of the aircraft 1, and the positions 30j, 30k, 30l, and 30m correspond to a lower surface of the aircraft 1.

The calculated surface electric field intensities at the respective positions 30a, 30b, 30c, 30d, 30e, 30f, 30g, 30h, 30i, 30j, 30k, 30l, and 30m may be added to the electric field distribution table as distribution data of reference surface electric field intensities for a sample of the already known external electric field. The already known electric field has an already known electric field direction including an azimuth and an elevation, which may be also associated with the external electric field in the electric field distribution table. As a result, the electric field distribution table illustrated in FIG. 5 may be generated. The generated electric field distribution table may be stored in the storage 50.

In the electric field distribution table illustrated in FIG. 5, Sample 1 which corresponds to a flight in a predetermined external electric field is associated with: distribution data of reference surface electric field intensities including A1, B1, C1, D1, E1, F1, G1, H1, I1, J1, K1, L1, and M1; and an electric field direction including AZ1 and EL1. Further, Sample 2 which corresponds to a flight in an external electric field having an electric field direction different from that of Sample 1 is associated with: distribution data of reference surface electric field intensities including A2, B2, C2, D2, E2, F2, G2, H2, 12, J2, K2, L2, and M2; and an electric field direction including AZ2 and EL2. The distribution data of the reference surface electric field intensities and the electric field direction including the azimuth and the elevation may be thus associated with a sufficient number of samples corresponding to mutually different external electric fields.

Described above is an example case where the simulation is carried out to provide the electric field distribution table; however, this is non-limiting. In one example embodiment, the electric field sensors 20 may be temporarily disposed at all of the positions 30a, 30b, 30c, 30d, 30e, 30f, 30g, 30h, 30i, 30j, 30k, 30l, and 30m to carry out an electrostatic field analysis, to provide the electric field distribution table.

The electric field sensors 20a, 20b, 20c, and 20d may be mounted on the aircraft 1 under a predetermined condition. For example, each of the electric field sensors 20a, 20b, 20c, and 20d may be disposed at or in the vicinity of any of the positions at which the reference surface electric field intensities have been calculated. In this example, the electric field sensors 20a, 20b, 20c, and 20d are disposed at the positions 30a, 30b, 30c, and 30d, respectively. As a result, for the identical external electric field, a ratio between the surface electric field intensities detected by any two of the electric field sensors 20a, 20b, 20c, and 20d and a ratio between the reference surface electric field intensities at corresponding two of the positions 30a, 30b, 30c, and 30d are caused to be the same or approximately the same as each other when an offset component (a bias component) due to electric charges needs not to be considered.

The four or more electric field sensors 20 may be prepared, and be disposed asymmetrically (in an unbalanced arrangement). The electric field sensors 20a, 20b, 20c, and 20d may be separated away from each other as much as possible. This increases deviations between the surface electric field intensities detected by the electric field sensors 20a, 20b, 20c, and 20d, thereby increasing accuracy in specifying the distribution data of the reference surface electric field intensities.

Figure 6:
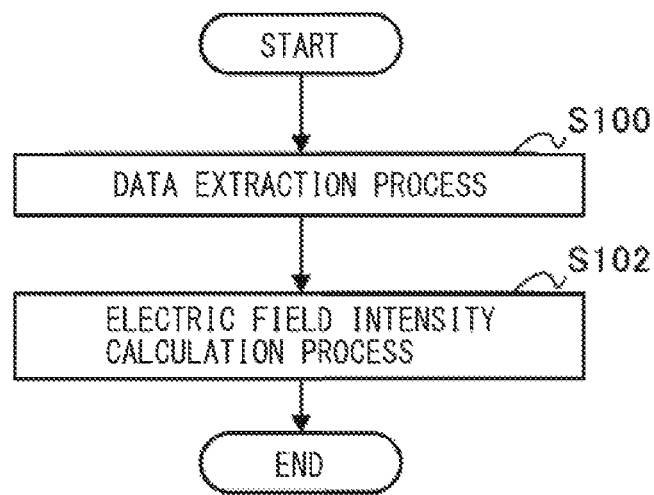
FIG. 6 is a flowchart illustrating an example of a flow of a process of calculating a distribution of surface electric field intensities.

The electric field sensors 20a, 20b, 20c, and 20d may each be disposed at a position other than a position easily struck by lightning such as the end of the wing. Examples of the position other than the position easily struck by lightning may include a position in the middle of the fuselage 10 and a position on the fuselage 10 side of the main wing 12. This reduces a possibility that the electric field sensor malfunctions due to the lightning strike. [Process of Calculating Distribution of Surface Electric Field Intensities] FIG. 6 is a flowchart illustrating a flow of an example of a process of calculating a distribution of surface electric field intensities. In this example, the process of calculating a distribution of surface electric field intensities may be performed on the basis of an interrupt signal supplied for each lapse of a predetermined time period. In the process of calculating a distribution of surface electric field intensities, the data extracting unit 52 may extract one piece of distribution data from the electric field distribution table on the basis of a result of detection performed by the electric field sensors 20a, 20b, 20c, and 20d (S100). The electric field intensity calculator 54 may calculate surface electric field intensities at multiple positions on the basis of the extracted piece of distribution data (S102). Each of the processes is described below in detail.

[Data Extraction Process S100]

The data extracting unit 52 may cancel: an offset component involved in the surface electric field intensities detected by the electric field sensors 20a, 20b, 20c, and 20d; and a ratio between the surface electric field intensities, thereby extracting one piece of distribution data from the electric field distribution table.

For example, assume that the electric field sensors 20a, 20b, 20c, and 20d have detected surface electric field intensities O, P, Q, and R, respectively. The surface electric field intensities O, P, Q, and R correspond to the reference surface electric field intensities A, B, C, and D at the positions 30a, 30b, 30c, and 30d in the electric field distribution table. For example, in a case where an electric field state (an electric field direction) of the detected surface electric field intensities O, P, Q, and R matches an electric field state (an electric field direction) of the reference surface electric field intensities A, B, C, and D, the surface electric field intensity O may be expressed as O=g·A+o, where A is the reference surface electric field intensity A, "o" is an offset component, and "g" is a gain. Similarly, the surface electric field intensities P, Q, and R may be expressed as: P=g·B+o; Q=g·C+o; and R=g·D+o.

Here, the offset component o and the gain g which are unknown quantities may be cancelled. First, the data extracting unit 52 may subtract one of the surface electric field intensities (in this example, O) from the rest of the surface electric field intensities (in this example, P, Q, and R). As a result, the surface electric field intensities P, Q, and R may be updated as: P'=P-O=g·(B-A); Q'=Q-O=g·(C-A); and R'=R-O=g·(D-A). This cancels the offset component o.

Thereafter, the data extracting unit 52 may divide, by one of the updated surface electric field intensities (in this example, P') of the updated surface electric field intensities (in this example, P', Q', and R') from the rest of the updated surface electric field intensities (in this example, Q' and R'). As a result, the surface electric field intensities Q' and R' may be updated as: Q"=(Q-O)/(P-O)=(C-A)/(B-A); and R"=(R-O)/(P-O)=(D-A)/(B-A). As can be appreciated from the updated surface electric field intensities Q" and R", both of the expressions for Q" and R" involve neither the offset component o nor the gain g. Accordingly, it is possible to identify the sample having an electric field state the same as or similar to a current electric field merely by determining a degree of matching between the surface electric field intensities Q" and R" and the reference surface electric field intensities A, B, C, and D in the electric field distribution table.

That is, the values of (Q-O)/(P-O) and (R-O)/(P-O) based on the surface electric field intensities O, P, Q, and R detected by the electric field sensors 20a, 20b, 20c, and 20d respectively match the values of (C-A)/(B-A) and (D-A)/(B-A) based on the reference surface electric field intensities A, B, C, and D in the electric field distribution table, the electric field state of the sample including the matching reference surface electric field intensities A, B, C, and D may be regarded the same as or similar to the current electric field state.

For example, referring to A2, B2, C2, and D2 of Sample 2 in the electric field distribution table illustrated in FIG. 5, suppose that: (C2-A2)/(B2-A2) is equal to or approximates to (Q-O)/(P-O); and (D2-A2)/(B2-A2) is equal to or approximates to (R-O)/(P-O). Herein, the wordings "X approximates to Y" refers to that a difference between X and Y is a value smaller than a threshold based on a least squares method.

In this case, the data extracting unit 52 may determine that the current electric field state is the same or similar to the electric field state of Sample 2 on the basis of that values resulting from cancelling the offset component involved in the surface electric field intensities detected by the electric field sensors 20a, 20b, 20c, and 20d and a ratio between the surface electric field intensities is equal to or approximates to the reference surface electric field intensities of Sample 2. In this case, the data extracting unit 52 may be able to identify, on the basis of the electric field distribution table, at least the electric field direction (the azimuth AZ2 and the elevation EL2) at the time when the electric field sensors 20a, 20b, 20c, and 20d have detected the surface electric field intensities.

Although the description above refers to an example where (C2−A2)/(B2−A2) and (D2−A2)/(B2−A2) are calculated to compare them with (Q−O)/(P−O) and (R−O)/(P−O), respectively, this is non-limiting. In one example, precalculated values may be associated with the values in the electric field distribution table, and the associated values may be referred to in the data extraction process S100. With this configuration, it is possible to reduce a process load.

[Electric Field Intensity Calculation Process S102]

The electric field intensity calculator 54 may multiply the distribution data by a ratio between any of the detected surface electric field intensities and the reference surface electric field intensity at the corresponding position where the surface electric field intensity has been detected, thereby calculating the surface electric field intensities at the positions.

For example, suppose that the electric field sensors 20a, 20b, 20c, and 20d have detected the surface electric field intensities O, P, Q, and R. In this case, the detected surface electric field intensities have values obtained by multiplying the reference surface electric field intensities of Sample 2 by a predetermined multiplication value. The predetermined multiplication value may correspond to the gain g described above. For example, such a predetermined multiplication value may be calculated with use of a ratio between: a difference between two values selected from the surface electric field intensities O, P, Q, and R detected by the electric field sensors 20a, 20b, 20c, and 20d; and a difference between two corresponding values selected from the reference surface electric field intensities A, B, C, and D. For example, the predetermined multiplication value may be (O−P)/(A2−B2). Further examples of the predetermined multiplication value may include (O−Q)/(A2−C2), (O−R)/(A2−D2), (P−Q)/(B2−C2), (P−R)/(B2−D2), and (Q−R)/(C2−D2).

Accordingly, the electric field intensity calculator 54 may multiply the distribution data of the reference surface electric field intensities by the predetermined multiplication value, for example, (O−P)/(A2−B2), to thereby calculate the surface electric field intensities at the positions 30e, 30f, 30g, 30h, 30i, 30j, 30k, 30l, and 30m other than the positions 30a, 30b, 30c, and 30d.

For example, the surface electric field intensity at the position 30e is E2×(O−P)/(A2−B2), the surface electric field intensity at the position 30f is F2×(O−P)/(A2−B2), the surface electric field intensity at the position 30g is G2×(O−P)/(A2−B2), the surface electric field intensity at the position 30h is H2×(O−P)/(A2−B2), the surface electric field intensity at the position 30i is I2×(O−P)/(A2−B2), the surface electric field intensity at the position 30j is J2×(O−P)/(A2−B2), the surface electric field intensity at the position 30k is K2×(O−P)/(A2−B2), the surface electric field intensity at the position 30l is L2×(O−P)/(A2−B2), and the surface electric field intensity at the position 30m is M2×(O−P)/(A2−B2).

Accordingly, the surface electric field intensities at the positions 30a, 30b, 30c, 30d, 30e, 30f, 30g, 30h, 30i, 30j, 30k, 30l, and 30m are, respectively, O, P, Q, R, E2×(O−P)/(A2−B2), F2×(O−P)/(A2−B2), G2×(O−P)/(A2−B2), H2×(O−P)/(A2−B2), I2×(O−P)/(A2−B2), J2×(O−P)/(A2−B2), K2×(O−P)/(A2−B2), L2×(O−P)/(A2−B2), and M2×(O−P)/(A2−B2).

Although the above description refers to an example where (O−P)/(A2−B2), which is one of the multiplication values based on combinations of: one of the surface electric field intensities O, P, Q, and R detected by the electric field sensor 20a, 20b, 20c, and 20d; and one of the reference surface electric field intensities A2, B2, C2, and D2 of Sample 2, this is non-limiting. In one example embodiment, any of the other multiplication values, i.e., (O−Q)/(A2−C2), (O−R)/(A2−D2), (P−Q)/(B2−C2), (P−R)/(B2−D2), and (Q−R)/(C2−D2) may be used. In another example embodiment, any one of or any combination of a mean value, a rout mean square value, a median value, a centroid value of the above-described six multiplication values may be used.

A charge amount (a charge component) corresponding to the offset component o may be calculated with use of the predetermined multiplication value. For example, the charge amount may be calculated by subtracting, from one value selected from the surface electric field intensities O, P, Q, and R detected by the electric field sensors 20a, 20b, 20c, and 20d, a value obtained by multiplying the corresponding one value selected from the reference surface electric field intensities A, B, C, and D by the predetermined multiplication value. That is, for example, the charge amount (the offset component o) may be calculated as: P−(the predetermined multiplication value)×A2.

With this configuration, it is possible to appropriately calculate at low cost the distribution of the surface electric field intensities at multiple positions on the airframe with the use of the electric field distribution table, on the basis of the result of the detection performed by a small number of electric field sensors 20. Moreover, the reduction in number of the electric field sensors 20 helps to reduce an occupied area or a weight. The reduction in number of the electric field sensors 20 also helps to reduce a process load, further resulting in an increase in reliability based on simplification of calculation.

In a case where the distribution data of the surface electric field intensities or the electric field direction is calculated as described above, the aircraft 1 may perform lightning strike prevention operation with use of the calculated distribution data or the calculated electric field direction. In the following, an example of performing the lightning strike prevention operation with use of the distribution data of the surface electric field intensities and an example of performing the lightning strike prevention operation with use of the electric field direction are described in this order.

[Use of Distribution Data of Surface Electric Field Intensities]

As described with reference to FIG. 3, when the aircraft 1 approaches the cloud CL, the airframe of the aircraft 1 is electrically polarized due to an influence of an electric field derived from electric charges of the cloud CL. Lightning strike may be caused by development of a streamer from an end of the aircraft 1 such as an end of a tail of the aircraft 1. Accordingly, if the development of a streamer is suppressed, it is possible to reduce a possibility of occurrence of lightning strike.

Figure 7:
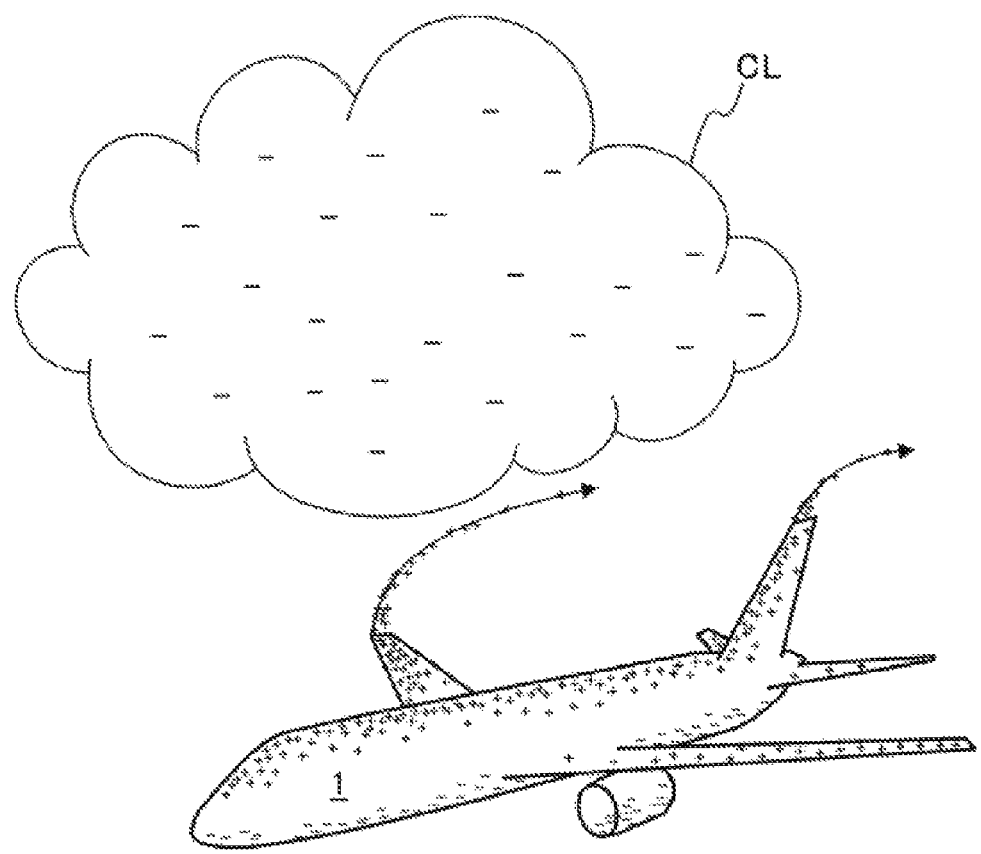
FIG. 7 is a schematic perspective view of an aircraft according to one example embodiment of the technology.

FIG. 7 is a schematic perspective view of the aircraft 1. It is known that a streamer develops more easily from a positively polarized side than from a negatively polarized side. For example, a streamer develops from the positively polarized side twice as easily as from the negatively polarized side. Accordingly, as illustrated by an arrow in FIG. 7, electric charges on the positively polarized side (positive ions) may be emitted to outside. This may reduce the electric charges on the positively polarized side (positive electric charges) and increase the electric charges on the negatively polarized side (negative electric charges). In other words, the surface electric field intensity on the positively polarized side may be decreased, and the surface electric field intensity of the negatively polarized side may be increased. In this example, intentionally, the airframe may be negatively charged by utilizing a characteristic that discharge is less likely to occur on the negatively polarized side than on the positively polarized side. This may suppress the surface electric field intensity on the positively polarized side while the surface electric field intensity on the negatively polarized side is increased, which results in a tradeoff, suppressing development of a streamer.

Figure 8:
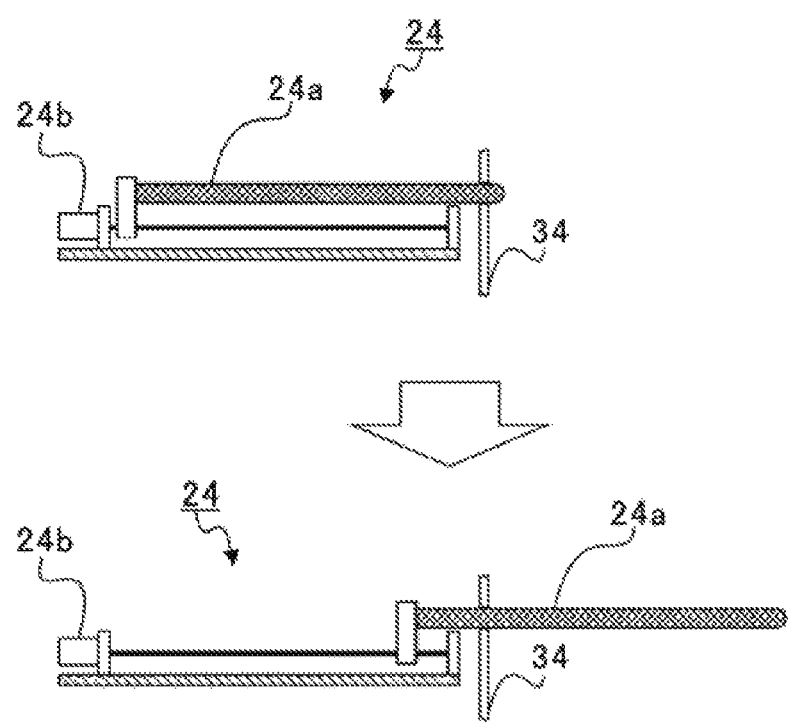
FIG. 8 is a schematic view of an example of a configuration of a member displacement mechanism.

FIG. 8 schematically illustrates an example of a configuration of the member displacement mechanism 24. The member displacement mechanism 24 may include an ion emission member 24a and an actuator 24b. The ion emission member 24a may include a columnar member having a high resistance (e.g., $10^8 \Omega$ or higher). For example, the ion emission member 24a may include a carbon rod having a length of 300 mm. The ion emission member 24a may be configured to emit ions from the airframe. In one example embodiment, the ion emission member 24a may include a bundle of relatively thin conductors instead of the rod.

The actuator 24b may be or may include, for example, a linear actuator. The actuator 24b may linearly displace the ion emission member 24a to adjust an amount of ion emission member 24a protruding from an airframe surface 34. For example, as illustrated in an upper part of FIG. 8, the ion emission member 24a may be usually provided inside the airframe surface 34. In a case where the ions are to be emitted, the displacement control unit 56 may cause the actuator 24b to displace the ion emission member 24a, causing the ion emission member 24a to be exposed outside the airframe surface 34, as illustrated in a lower part of FIG. 8.

In a case where the ion emission member 24a is exposed outside the airframe surface 34 in an electric field having a high electric field intensity, a strong electric field generated around the ion emission member 24a causes breakdown in the air. When outside air passes by the ion emission member 24a as a result of the flight of the aircraft 1, charged ions may be pushed out (leak). As illustrated in FIG. 7, the emitted ions may form an ionized airflow that flows downstream from a position of the ion emission member 24a, thereby being discharged from the aircraft 1. As a result, electric charges of the aircraft 1 may vary.

For example, in a case where a region corresponding to the member displacement mechanism 24 is positively charged, positive ions may be emitted from the ion emission member 24a, causing the aircraft 1 to be negatively charged. In contrast, in a case where a region corresponding to the member displacement mechanism 24 is negatively charged, negative ions may be emitted from the ion emission member 24a, causing the aircraft 1 to be positively charged.

In this example, in order to negatively charge the aircraft 1, the displacement control unit 56 may cause the ion emission member 24a corresponding to a positively charged region to be exposed outside the airframe surface 34. The surface electric field intensity on the positively charged side is thus decreased, suppressing the development of the streamer.

Figure 9:
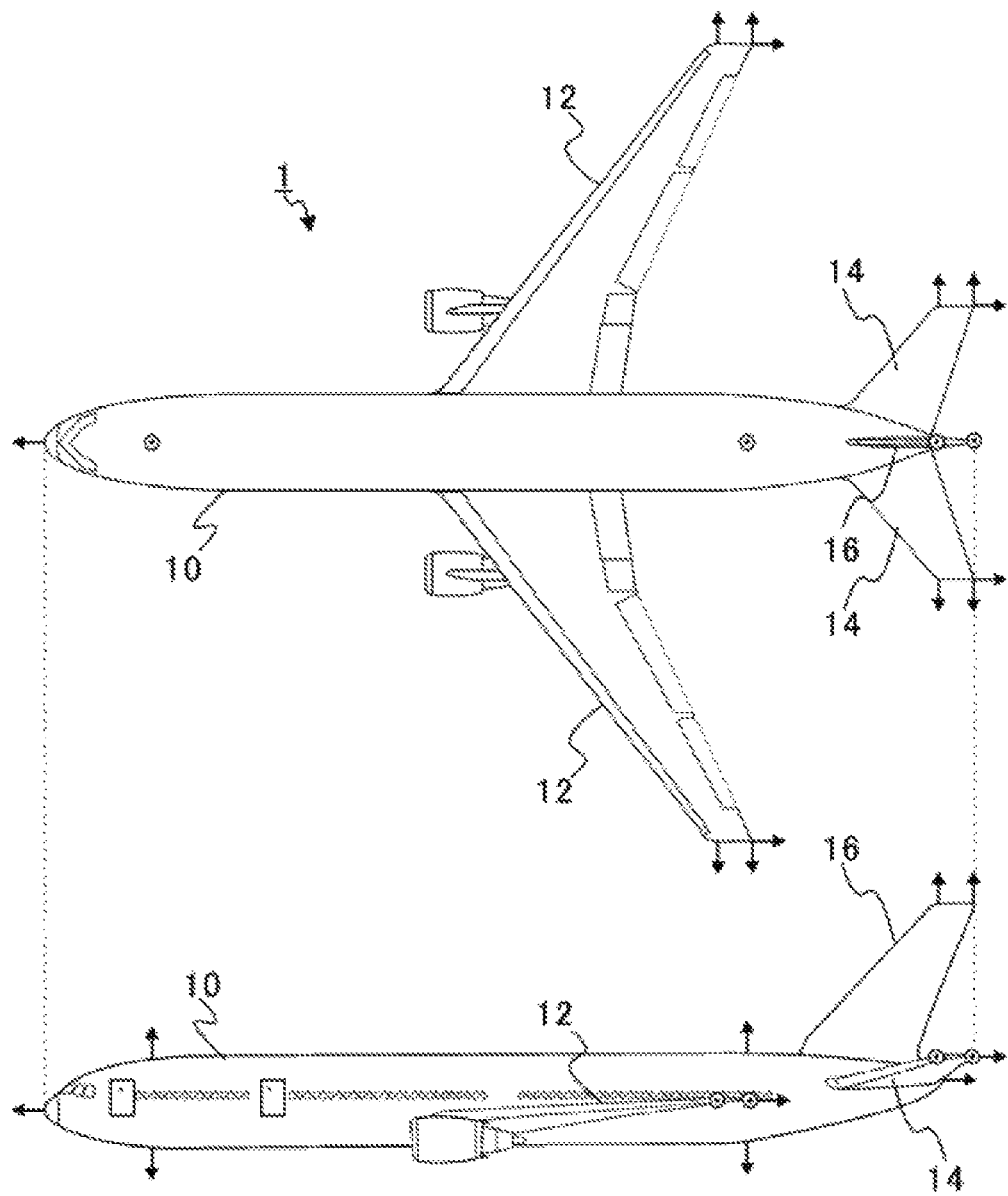
FIG. 9 is a diagram for describing an example of positions to provide the displacement mechanisms.

FIG. 9 is a diagram for describing an example of positions to dispose the member displacement mechanisms 24. The member displacement mechanisms 24 may be disposed at two or more locations on the aircraft 1. For example, the member displacement mechanisms 24 may be disposed at a nose, an upper-front part of the fuselage 10, a lower-front part of the fuselage 10, a left end of the main wing 12, a right end of the main wing 12, an upper-rear part of the fuselage 10, a lower-rear part of the fuselage 10, a left end of the horizontal tail 14, a right end of the horizontal tail 14, an upper end of the vertical tail 16, and a tail that are ends of the aircraft 1. The displacement control unit 56 may cause each of the ion emission members 24a to protrude in a corresponding one of directions indicated by arrows illustrated in FIG. 9.

The displacement control unit 56 may control displacement of the member displacement mechanism 24 disposed at a positively charged region, thereby causing the ion emission member 24a to protrude and to emit positive ions. For example, as illustrated in FIG. 3, in a case where the aircraft 1 flies on the left side of the vicinity of the region below the negatively charged cloud CL, an upper part of the right end of the main wing 12 of the aircraft 1 may be positively polarized. Accordingly, the displacement control unit 56 may control the displacement of the member displacement mechanism 24 disposed at the right end of the main wing 12. In a case where the aircraft 1 flies on the left side of the vicinity of the region below the positively charged cloud CL, a lower part of the left end of the main wing 12 of the aircraft 1 may be positively polarized. Accordingly, the displacement control unit 56 may control the displacement of the member displacement mechanism 24 disposed at the left end of the main wing 12.

Figure 10:
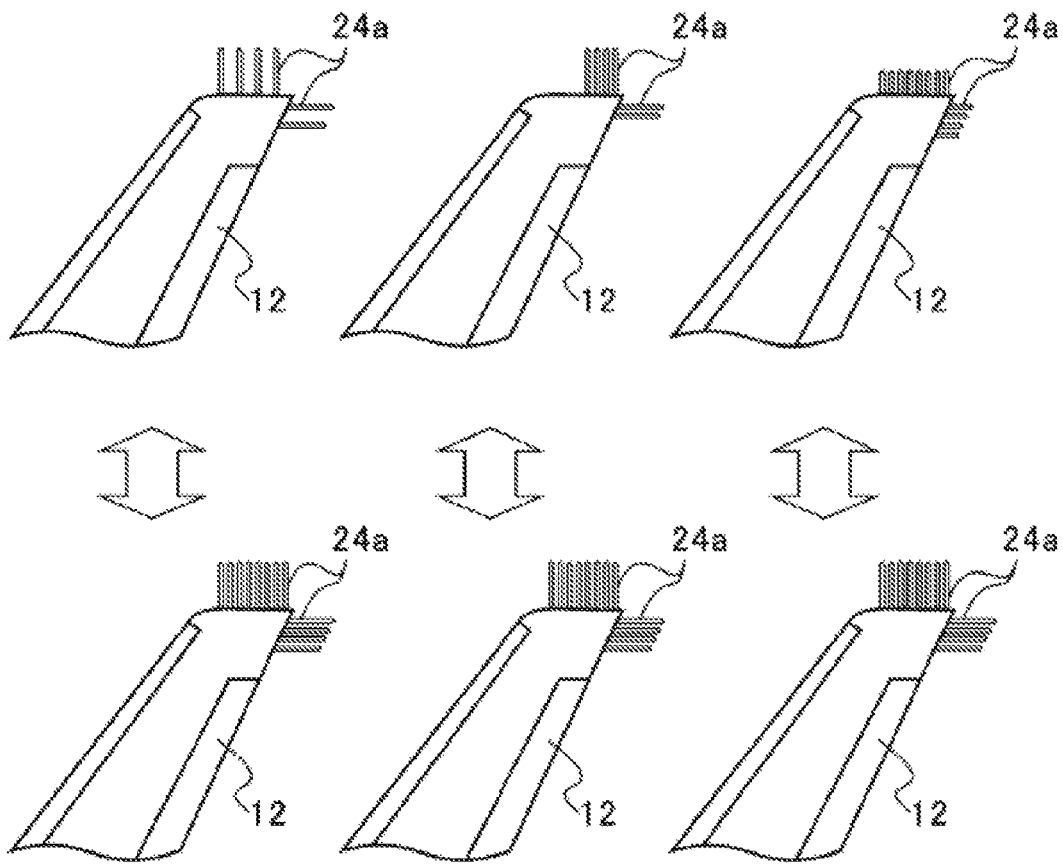
FIG. 10 is a diagram illustrating examples of a displacement state of the member displacement mechanisms.

FIG. 10 illustrates examples of a displacement state of the member displacement mechanism 24. The displacement control unit 56 may not merely displace the member displacement mechanism 24, but may also change the displacement state of the member displacement mechanism 24 depending on an intensity of the external electric field (hereinafter, simply referred to as an external electric field intensity).

For example, in a case of a high external electric field intensity, that is, in a case where the multiplication value obtained in the calculation of the surface electric field intensity by the electric field intensity calculator 54 is relatively high, the displacement control unit 56 may reduce a total protruding amount of the ion emission members 24a. In a case of a low external electric field intensity, that is, in a case where the multiplication value obtained in the calculation of the surface electric field intensity by the electric field intensity calculator 54 is relatively low, the displacement control unit 56 may increase the total protruding amount of the ion emission members 24a. One reason for this is that, in the case of the high external electric field intensity, a desired amount of positive ions may be appropriately emitted even if the total protruding amount of the ion emission members 24a is small; but in the case of the low external electric field intensity, it may be difficult to emit a desired amount of positive ions unless the total protruding amount of the ion emission members 24a is increased.

For example, as illustrated in FIG. 10, in the case of the high external electric field intensity, the displacement control unit 56 may decrease the density of the ion emission members 24a, reduce the number of the ion emission members 24a to protrude, or reduce the protruding length of the ion emission members 24a, thereby reducing the total protruding amount of the ion emission members 24a. For example, as illustrated in FIG. 10, in the case of the low external electric field intensity, the displacement control unit

56 may increase the density of the ion emission members 24a, increase the number of the ion emission members 24a to protrude, or increase the protruding length of the ion emission members 24a, thereby increasing the total protruding amount of the ion emission members 24a.

With such a configuration in which the displacement control unit 56 may change the displacement state of the member displacement mechanism 24 depending on the external electric field intensity, it is possible to emit an appropriate amount of positive ions.

[Displacement Process]

Figure 11:
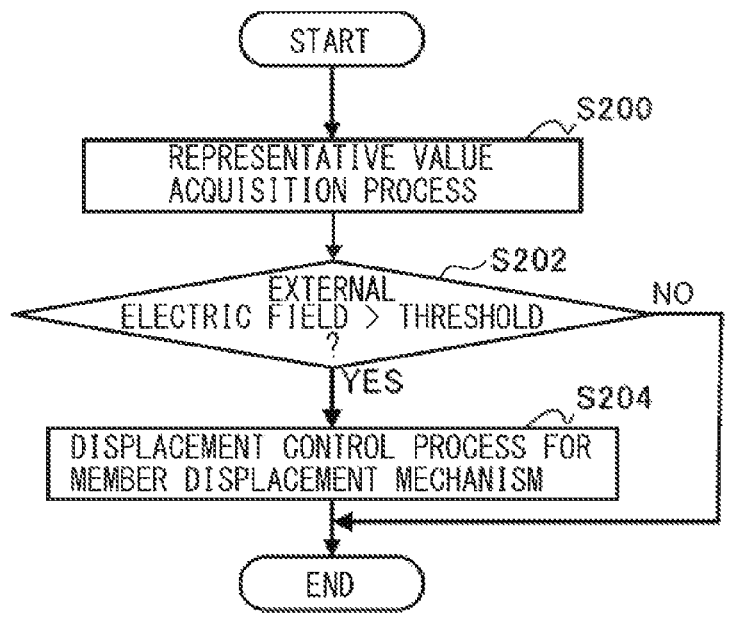
FIG. 11 is a flowchart illustrating an example of a flow of a displacement process.

FIG. 11 is a flowchart illustrating an example of a flow of a displacement process. The displacement process may be performed on the basis of an interrupt signal supplied for each lapse of a predetermined time period. In the displacement process, the displacement control unit 56 may acquire a negative representative value and a positive representative value (S200). The negative representative value may represent a surface electric field intensity of a surface on the negatively polarized side of the airframe as a whole. The positive representative value may represent a surface electric field intensity of a surface on the positively polarized side of the airframe as a whole. Thereafter, the displacement control unit 56 may determine the external electric field intensity (S202). The displacement control unit 56 may control the displacement of the member displacement mechanism 24 on the basis of a result of the determination (S204). Each of the processes is described below in detail.

[Representative Value Acquisition Process S200]

First, the displacement control unit 56 may acquire the positive representative value and the negative representative value. In this example, whether the representative value is the positive representative value or the negative representative value may not matter, as the following control amount calculation is performed. In this example, a maximum value of the calculated surface electric field intensities on the positively polarized side of the airframe as a whole, which is hereinafter simply referred to as a positive maximum value, may be used as the positive representative value, and a maximum value of the calculated surface electric field intensities on the negatively polarized side of the airframe as a whole, which is hereinafter simply referred to as a negative maximum value, may be used as the negative representative value. The displacement control unit 56 may acquire the positive maximum value and the negative maximum value.

[External Electric Field Intensity Determination S202]

In the case of a high external electric field intensity, that is, in a case where the positive maximum value is greater than a predetermined threshold (YES in S202), the displacement control unit 56 may cause the process to proceed to step S204. In step S204, the displacement control unit 56 may control the displacement of the member displacement mechanism 24.

One reason for this is that the displacement control process for the member displacement mechanism in step S204 is performed to prevent lightning strike, only in the case of the high external electric field intensity which results in a high possibility of lightning strike, and the displacement control process for the member displacement mechanism in step S204 is not performed in the case of the low external electric field intensity which results in a low possibility of lightning strike, thereby reducing a process load.

[Displacement Control Process for Member Displacement Mechanism S204]

The displacement control unit 56 may so control the displacement of the member displacement mechanism 24 that an absolute value of the positive representative value is less than an absolute value of the negative representative value. In this example, a control amount calculation may be carried out, using the positive maximum value and the negative maximum value as the positive representative value and the negative representative value, respectively, to thereby calculate a control amount of the member displacement mechanism 24.

Figure 12:
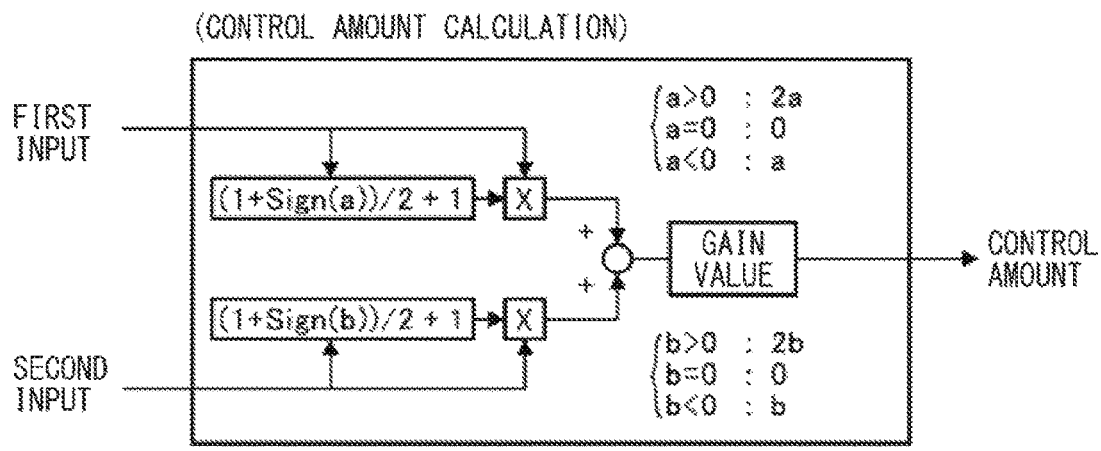
FIG. 12 is a diagram illustrating an example of a control amount calculation.

FIG. 12 illustrates an example of the control amount calculation. The control amount calculation may be performed by hardware such as an electric circuit, or may be performed by software installed on the displacement control unit 56. In this example, the control amount of the member displacement mechanism 24 may be so calculated that the absolute value of the positive maximum value becomes ½ of the absolute value of the negative maximum value.

Referring to FIG. 12, in the control amount calculation, the positive maximum value may be supplied to a first input, and the negative maximum value may be supplied to a second input. In "(1+Sign(a))/2+1" and "(1+Sign(b))/2+1", "Sign" is a sign function, which is: "1" in a case where the input is a positive number; is "−1" in a case where the input is a negative number; and is "0" in a case where the input is 0 (zero).

For example, in a case where the first input is greater than 0 and the second input is less than 0, a double value of the first input and a value of the second input as it is may be added, which may be multiplied by a predetermined gain value to calculate the control amount. For example, the calculation of the control amount may result in a positive value until the first input becomes ½ of the second input (the first input>the second input×½).

The control amount calculated in the control amount calculation may be supplied to the member displacement mechanism 24 that is disposed at a position in the positively charged region, and may be used as the total protruding amount of the ion emission member 24a. For example, in a case where the electric charge amount of the airframe is 0 (zero), the positive electric field and the negative electric field to be observed may be approximately equal to each other, and the control amount calculation may result in a positive control amount. In this case, the ion emission member 24a may emit positive ions. This negatively charges the airframe, adjusting the electric field intensity on the positively polarized side to be ½ of the electric field intensity on the negatively polarized side.

As a result, the value of the first input and the value of the second input may be negatively biased, reducing a difference in the control amount calculation. This may stabilize the ratio between the positive electric charges and the negative electric charges at a desired ratio (1:2).

The electric charges of the airframe may be thus feedback controlled, and the absolute value of the positive representative value/the absolute value of the negative representative value may be made closer to ½. Note that the ratio represented by the absolute value of the positive representative value/the absolute value of the negative representative value may be a value other than ½ as long as it is less than 1. With such a configuration in which the displacement control unit 56 may so control the member displacement mechanism 24 that the absolute value of the positive representative value is less than the absolute value of the negative representative value, the surface electric field intensity on the positively polarized side is decreased although the surface electric field intensity on the negatively polarized side is increased, thereby making it possible to reduce development of a streamer as a whole.

[Use of Electric Field Direction]

The lightning strike prevention operation for the aircraft 1 may be performed not only on the basis of the above-described distribution data of the surface electric field intensities but also on the basis of the electric field direction.

To prevent such lightning strike triggered by the aircraft 1, it is effective to forecast a position of appearance of the cloud CL at the aircraft 1 or a ground facility and calculate a flight route that allows for prevention of the cloud CL itself. Unfortunately, the appearance of the cloud CL is susceptible to season and air temperature and is irregular accordingly. Even if the appearance of the cloud CL is forecasted successfully, it is difficult to accurately predict a position of occurrence of the lightning strike triggered by the aircraft 1 under the cloud CL actually appeared. One reason is that, although it is easy to predict a position of occurrence of the lightning strike for a cumulonimbus cloud (or a thundercloud) seen in summer, it is difficult to predict a position of occurrence of the lightning strike for cloud streets seen in winter, for example.

Accordingly, the aircraft 1 can receive an influence of lightning strike in the vicinity of the cloud CL in a case where the cloud CL suddenly appears around a flight route, even if the flight route is intended to prevent the lightning strike. As described above, the positive electric charges and the negative electric charges in the aircraft 1 are biased primarily depending on the electric field direction around the aircraft 1. Specifically, the electric field having a predetermined direction is formed in the air by the cloud CL, and the positive electric charges and the negative electric charges are biased as illustrated in FIG. 3 when the aircraft 1 flies through the electric field. In this example, the electric field direction specified by the data extracting unit 52 may be used to change the attitude of the airframe of the aircraft 1 to an attitude of the airframe that minimizes an influence of the electric field. An example embodiment thus reduces the biasing of the electric charges, i.e., the positive electric charges and the negative electric charges, in the aircraft 1. Described in the following is an example of such a process.

[Process of Controlling Lightning Strike Prevention Attitude]

Figure 13:
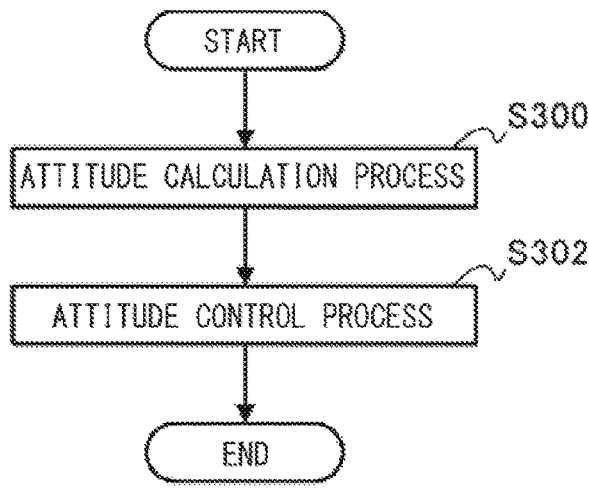
FIG. 13 is a flowchart illustrating an example of a flow of a process of controlling a lightning strike prevention attitude.

FIG. 13 is a flowchart illustrating an example of a flow of a process of controlling a lightning strike prevention attitude. In an example embodiment, the process of controlling the lightning strike prevention attitude may be executed by the flight controller 26 in accordance with an interrupt signal supplied for each lapse of a predetermined time period. In the process of controlling the lightning strike prevention attitude, the attitude calculator 58 may calculate a target airframe attitude that reduces a possibility of the occurrence of the lightning strike on the aircraft 1, on the basis of the electric field direction identified by the data extracting unit 52 (S300). Thereafter, the attitude control unit 60 may so control the attitude of the airframe of the aircraft 1 that the calculated target airframe attitude is attained (S302). Each of the processes is described below in detail.

[Attitude Calculation Process S300]

It can be appreciated from an example illustrated in FIG. 3 that the electric field intensities corresponding to the positive electric charges are higher from the upper left side to the upper right side of the main wing 12 of the aircraft 1. In other words, the positive electric charges are biased on the upper right side of the aircraft 1. Under such circumstances, the lightning strike can occur easily in the vicinity of the right end of the main wing 12 of the aircraft 1 if the aircraft 1 flies in the vicinity of a region below the cloud CL which is negatively charged. Meanwhile, the electric field intensities corresponding to the negative electric charges are higher from the lower right side to the lower left side of the main wing 12 of the aircraft 1, whereby the negative electric charges are biased on the lower left side of the aircraft 1. Under such circumstances, the lightning strike can occur easily in the vicinity of the left end of the main wing 12 of the FIG. 13 aircraft 1 if the aircraft 1 flies in the vicinity of a region above the cloud CL which is positively charged.

The attitude calculator 58 may calculate the target airframe attitude that allows for reduced biasing of the positive electric charges or the negative electric charges, on the basis of the electric field direction identified by the data extracting unit 52. For example, on the basis of the identified electric field direction, the attitude calculator 58 may calculate the target airframe attitude that reduces the possibility of the lightning strike on the aircraft 1 by smoothing the biasing of the electric field intensities.

First, the attitude calculator 58 may calculate a plane formed on the basis of relatively protruding parts of the aircraft 1. Hereinafter, the relatively protruding parts are each referred to as a "protrusion", and the plane formed on the basis of the relatively protruding parts of the aircraft 1 is referred to as a "protrusion plane".

Figure 14:
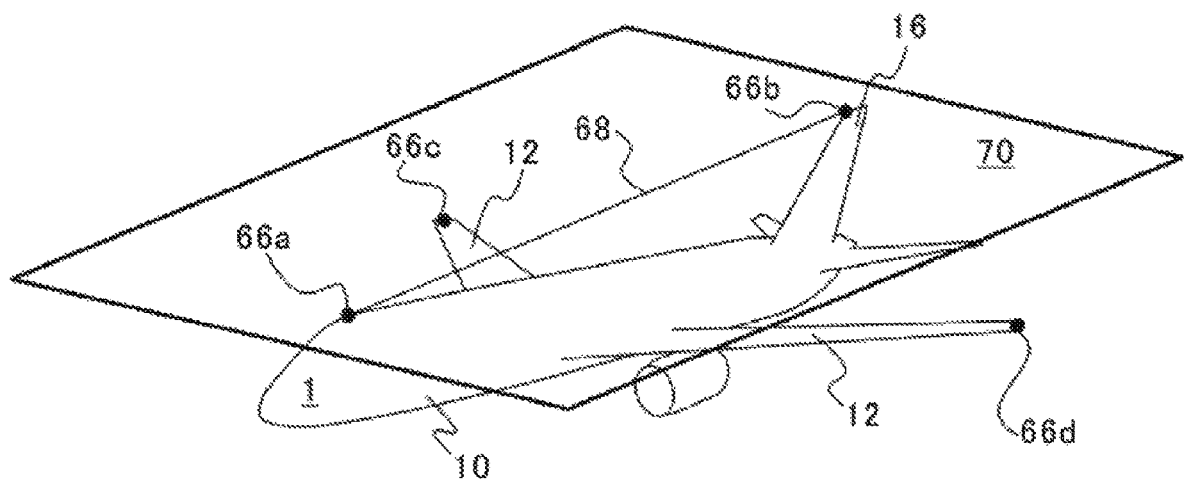
FIG. 14 is a diagram illustrating an example of a protrusion plane.

FIG. 14 illustrates an example of the protrusion plane. For example, the protrusions positioned on the vertical upper side of the aircraft 1 may include: a vertical upper part 66a provided at or near the cockpit positioned at the front of the fuselage 10; a vertical upper part 66b of the vertical tail 16; a right end 66c of the main wing 12; and a left end 66d of the main wing 12.

The attitude calculator 58 may form a plane that is positioned on the vertical upper side of all of the set protrusions, e.g., the vertical upper part 66a, the vertical upper part 66b, the right end 66c, and the left end 66d. For example, the attitude calculator 58 may set, as a protrusion plane 70, a plane including a line 68 that connects the vertical upper part 66a provided at or near the cockpit and the vertical upper part 66b of the vertical tail 16, and in which distances from the right end 66c of the main wing 12 and the left end 66d of the main wing 12 are equal to each other.

In an example embodiment, the protrusion plane 70 may be the plane positioned on the vertical upper side of all of the protrusions, e.g., the vertical upper part 66a, the vertical upper part 66b, the right end 66c, and the left end 66d. However, forming the protrusion plane 70 on the basis of the protrusions of the aircraft 1, e.g., the vertical upper part 66a, the vertical upper part 66b, the right end 66c, and the left end 66d, suffices. For example, an approximate plane based on the protrusions, e.g., the vertical upper part 66a, the vertical upper part 66b, the right end 66c, and the left end 66d, may be set as the protrusion plane 70. In some embodiments, the approximate plane may be a plane in which a total of distances from the vertical upper part 66a, the vertical upper part 66b, the right end 66c, and the left end 66d becomes the minimum.

In an example embodiment, the attitude calculator 58 may calculate the protrusion plane on the basis of shapes of the protrusions, e.g., the vertical upper part 66a, the vertical upper part 66b, the right end 66c, and the left end 66d, that are the same as each other. Note that densities of electric charges can differ depending on the shapes of the protrusions, e.g., the vertical upper part 66a, the vertical upper part 66b, the right end 66c, and the left end 66d. For example, the electric charges can become dense, which can increase the electric field intensity and thus lead to easier occurrence of the lightning strike if a shape of any of the protrusions, e.g., the vertical upper part 66a, the vertical upper part 66b, the right end 66c, and the left end 66d is sharp or a corner thereof is at an acute angle. Meanwhile, if the shape of any of the protrusions, e.g., the vertical upper part 66a, the vertical upper part 66b, the right end 66c, and the left end 66d is flat or spherical, or the corner thereof is at an obtuse angle, the electric charges are dispersed, which decreases the electric field intensity and thus makes the lightning strike difficult to occur. Accordingly, in some embodiments, the attitude calculator 58 may calculate the protrusion plane 70 not only on the basis of the positions of the protrusions, e.g., the vertical upper part 66a, the vertical upper part 66b, the right end 66c, and the left end 66d, but also on the basis of the shape of any of the protrusions. For example, if the shape of any of the protrusions is at the acute angle, the attitude calculator 58 may calculate the protrusion plane 70 by causing the position of the relevant protrusion to be shifted toward the outer side of the airframe.

Note that the cloud CL is positioned on the vertical upper side of the aircraft 1 and the protrusion plane 70 may be formed on the basis of the protrusions that are positioned on the vertical upper side of the aircraft 1 accordingly in an example embodiment. In some embodiments, a protrusion to be subjected to the formation of the protrusion plane 70 may be changed depending on a position of the cloud CL. For example, a protrusion positioned on the vertical lower side of the aircraft 1, such as a lower part of the fuselage 10, may be subjected to the formation of the protrusion plane 70 in a case where the cloud CL is positioned on the vertical lower side of the aircraft 1.

Thereafter, the attitude calculator 58 may calculate the target airframe attitude in which the protrusion plane 70 intersects perpendicularly with the electric field direction identified by the data extracting unit 52. Upon calculating such a target airframe attitude, the attitude calculator 58 may decompose the electric field direction represented by the azimuth and the elevation into the pitch axis and the roll axis.

Figure 15:
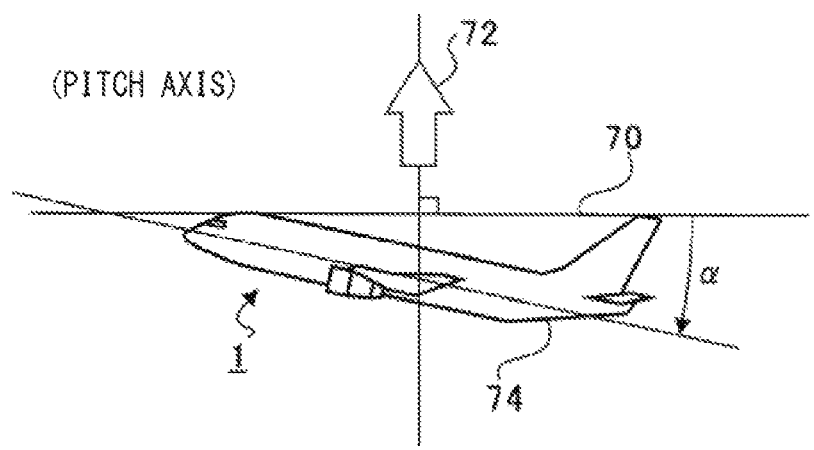
FIG. 15 is a diagram illustrating an example of a target airframe attitude.
Figure 15:
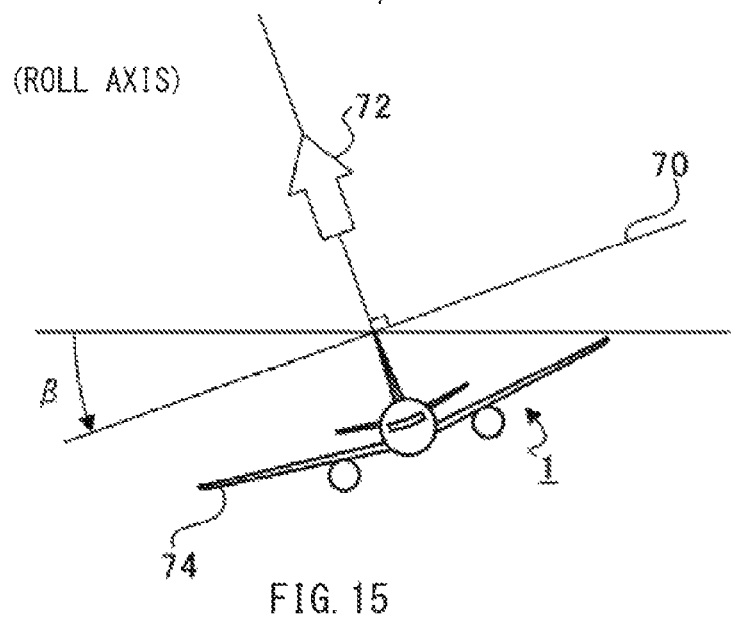

FIG. 15 illustrates an example of the target airframe attitude. Referring to FIG. 15, for example, the attitude calculator 58 may calculate a target airframe attitude 74 in which an angle about the pitch axis (the pitch angle) is tilted at an angle of a degrees such that the protrusion plane 70 becomes perpendicular to an electric field direction 72. In addition, the attitude calculator 58 may calculate the target airframe attitude 74 in which an angle about the roll axis (the roll angle) is tilted at an angle of β degrees such that the protrusion plane 70 becomes perpendicular to the electric field direction 72. In an example embodiment, the attitude calculator 58 may cause the attitude of the airframe of the aircraft 1 to be the target airframe attitude 74 in which the protrusion plane 70 and the electric field direction 72 intersect perpendicularly with each other to thereby make the electric field intensities at the respective protrusions even.

In some embodiments, the attitude calculator 58 may calculate the target airframe attitude 74 within a range that allows for continuation of a stable flight (e.g., within the pitch angle from −30 degrees to +30 degrees and the roll angle from −30 degrees to +30 degrees) and within a range that does not significantly change a flight route. Accordingly, the attitude calculator 58 may limit the target airframe attitude 74 within the range that allows for the continuation of the stable flight and within the range that does not significantly change the flight route, in a case where the target airframe attitude 74 in which the protrusion plane 70 intersects perpendicularly with the electric field direction 72 is determined as interfering with the stable flight or as requiring a significant change in the flight route.

Note that the attitude calculator 58 may calculate the target airframe attitude 74 on the basis of the electric field intensity distribution at a certain point of time, although the calculation of the target airframe attitude 74 is not limited thereto. For example, the attitude calculator 58 may calculate the target airframe attitude 74 on the basis of the time change of the electric field intensity distribution by means of a control such as a PID (Proportional-Integral-Differential) control.

[Attitude Control Process S302]

The attitude control unit 60 may control the attitude of the airframe of the aircraft 1 to cause the attitude of the airframe to be the target airframe attitude 74 calculated by the attitude calculator 58. For example, the attitude control unit 60 may first provide the pilot with information or a warning that the attitude of the airframe of the aircraft 1 is to be set to the target airframe attitude 74 calculated by the attitude calculator 58. If the pilot accepts the setting of the attitude of the airframe of the aircraft 1 to the target airframe attitude 74, the attitude control unit 60 may input the target airframe attitude 74 as an input of operation. This helps to attain the target airframe attitude 74 that reduces the possibility of the lightning strike while preventing the pilot from being perplexed by a sudden change in the attitude of the airframe.

In some embodiments, the attitude control unit 60 may notify, by means of a device such as a display, the pilot of the target airframe attitude 74 itself calculated by the attitude calculator 58. In this case, the pilot may visually confirm the target airframe attitude 74 to control the attitude of the airframe of the aircraft 1 manually. This helps to attain the target airframe attitude 74 with the target airframe attitude 74 being recognized by the pilot.

Figure 16:
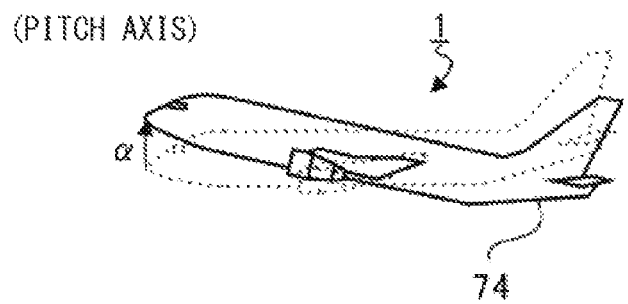
FIG. 16 is a diagram illustrating an example of an attitude control process.
Figure 16:
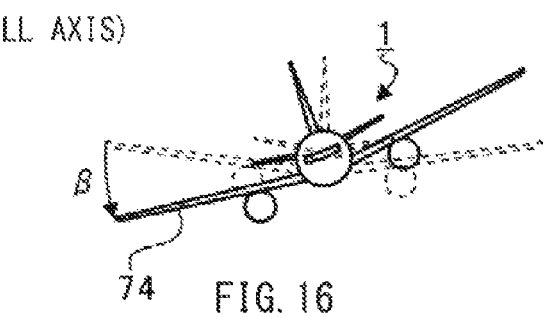

FIG. 16 illustrates an example of an attitude control process. Referring to FIG. 16, the attitude control unit 60 may tilt the nose toward the vertical upper side at the pitch angle of a degrees and cause the bank angle to be tilted at the roll angle of β degrees, on the basis of the inputted target airframe attitude 74. The attitude control unit 60 may control the attitude of the airframe by performing feedback of the detection result acquired by the attitude sensor 18, with the target airframe attitude 74 being the target.

After the attitude of the airframe is set to the target airframe attitude 74, the flight controller 26 may acquire the electric field intensities of the respective electric field sensors 20 again. The flight controller 26 may execute the processes starting from the attitude calculation process S300 again in a case where deviation of any of the electric field intensities exceeds a predetermined range.

In some embodiments, the attitude control unit 60 may adjust a rate of changing the attitude of the airframe, instead of controlling the attitude of the airframe to be the target airframe attitude 74 immediately. For example, the attitude of the airframe may be so changed to the target airframe attitude, inputted on the basis of a first order lag filter, as to involve a predetermined time constant. This helps to ensure a safety of the pilot and a passenger even upon rapidly changing the attitude of the airframe due to appearance of the cloud CL.

It is to be also noted that the electric field distribution table illustrated in FIG. 5, in which the electric field intensity distribution and the electric field direction are associated with each other, may be used to identify the electric field direction in an example embodiment. In some embodiments, the plurality of electric field sensors 20 disposed symmetrically with respect to the roll axis of the airframe (e.g., the electric field sensors 20 disposed on the right end of the main wing 12 and the left end of the main wing 12) may be used to control the attitude of the aircraft 1 such that the detection results (e.g., the electric field intensities) acquired by the plurality of electric field sensors 20 (e.g., two electric field sensors 20) become equal to each other. In such embodiments, the attitude calculator 58 may calculate the target airframe attitude 74 and the attitude control unit 60 may control the attitude of the airframe of the aircraft 1, on the basis of the electric field direction estimated substantially on the basis of the detection results acquired by the symmetrically-disposed electric field sensors 20.

With the configuration according to an example embodiment described above, it is possible to make the electric field intensity distribution corresponding to both the positive electric charges and the negative electric charges even with use of the electric field identified by the data extracting unit 52 and thus cause the attitude of the airframe of the aircraft 1 to be the airframe attitude that reduces the possibility of occurrence of the lightning strike on the aircraft 1. Hence, it is possible to reduce the influence of the lightning strike.

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, an example embodiment described above may reduce, in a case where the cloud CL has appeared around the flight route, the influence of the lightning strike by controlling the attitude of the airframe of the aircraft 1, in a region that is in the vicinity of the cloud CL and in which a possibility of the occurrence of the lightning strike triggered by the aircraft 1 is high. Depending on a flight situation, however, a desired attitude of the airframe can be unachievable, or a deviation can occur from a desired flight route due to the sudden control of the attitude of the airframe. To address this, the surface electric field intensity, the electric field direction, or any other data identified by the data extracting unit 52 may be transmitted to a following aircraft 1 that flies behind the own aircraft. The following aircraft 1 may be an aircraft 1 that flies behind the own aircraft along a route similar to that of the own aircraft. Accordingly, the following aircraft 1 may calculate a flight route that allows for a control that changes the attitude of the airframe of the following aircraft 1 to the airframe attitude that reduces the possibility of occurrence of the lightning strike to thereby reduce the influence of the lightning strike, upon passing through the region in the vicinity of the cloud CL, e.g., upon passing through the region that is in the vicinity of the cloud CL and in which the possibility of the occurrence of the lightning strike is high.

The configuration described above according to an example embodiment, which transmits the surface electric field intensity, the electric field direction, or any other data identified by the data extracting unit 52 to the following aircraft 1, makes the electric field intensity distribution corresponding to both the positive electric charges and the negative electric charges even and thus allows for the calculation of the flight route that causes the attitude of the airframe of the aircraft 1 to be the airframe attitude that reduces the possibility of occurrence of the lightning strike on the aircraft 1. Hence, it is possible to reduce the influence of the lightning strike while helping to ensure the safety of the pilot and the passenger.

At least one embodiment also provides a program that causes a computer to operate as the flight controller 26, and a computer-readable recording medium that stores the program. Non-limiting examples of the recording medium may include a flexible disk, a magneto-optical disk, ROM, CD, DVD (Registered Trademark), and BD (Registered Trademark). As used herein, the term "program" may refer to a data processor written in any language and any description method.

The aircraft 1 may include all of the data extracting unit 52, the electric field intensity calculator 54, and the attitude control unit 60, or all of the data extracting unit 52, the electric field intensity calculator 54, the displacement control unit 56, the attitude calculator 58, and the attitude control unit 60 in an example embodiment described above. In some embodiments, the ground facility may include all or a part of the data extracting unit 52, the electric field intensity calculator 54, the displacement control unit 56, the attitude calculator 58, and the attitude control unit 60. In such embodiments, the flight of the aircraft 1 may be controlled entirely or partly on the basis of a result acquired by the ground facility.

All or a part of the processes of each of the process of calculating the distribution of the surface electric intensities, the process of displacing, and the process of controlling the lightning strike prevention attitude as disclosed herein do not necessarily have to be processed on a time-series basis in the order described in the example flowcharts. All or a part of the processes may involve parallel processing or processing based on subroutine.

The flight controller 26 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the flight controller 26. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the flight controller 26 illustrated in FIG. 2.

The invention claimed is:
1. An aircraft comprising:
a fuselage;
a main wing attached to the fuselage and configured to generate lift that acts on the aircraft;
a storage that holds an electric field distribution table including electric field intensity distributions on a surface of the aircraft, wherein the electric field intensity distributions are expected to be obtained when the aircraft receives external electric fields having electric field directions different from each other, wherein each electric field intensity distribution includes reference electric field intensities at m positions on the aircraft, and wherein m is an integer;

electric field sensors disposed at n positions on the aircraft, and configured to detect surface electric field intensities at the n positions on the aircraft, wherein n is an integer that is less than m, and wherein the n positions at which the respective electric field sensors are disposed are arranged at, or adjacent to, n of the m positions, respectively; and a flight controller including:
  a data extracting unit configured to extract one of the electric field intensity distributions from the electric field distribution table on a basis of the detected surface electric field intensities at the n positions on the aircraft;
  an electric field intensity calculator configured to calculate surface electric field intensities at the m positions on a basis of the extracted one of the electric field intensity distributions; and
  an attitude control unit configured to perform prevention operation of the aircraft on a basis of the calculated surface electric field intensities at the m positions.

2. The aircraft according to claim 1, wherein
the data extracting unit is configured to cancel an offset component involved in the surface electric field intensities detected by the electric field sensors and a ratio between any two of the surface electric field intensities detected by the electric field sensors to extract one of the electric field intensity distributions from the electric field distribution table, and
the electric field intensity calculator is configured to multiply the extracted one of the electric field intensity distributions by a ratio between one of the detected surface electric field intensities and corresponding one of the reference surface electric field intensities to calculate the surface electric field intensities at the m positions.

3. The aircraft according to claim 1, wherein
the electric field distribution table further includes the electric field directions associated with the electric field intensity distributions, respectively, and
the data extracting unit is configured to identify one of the electric field directions associated with the extracted one of the electric field intensity distributions.

4. The aircraft according to claim 2, wherein
the electric field distribution table further includes the electric field directions associated with the electric field intensity distributions, respectively, and
the data extracting unit is configured to identify one of the electric field directions associated with the extracted one of the electric field intensity distributions.

5. A flight controller for aircraft, the flight controller comprising:
a storage that holds an electric field distribution table including electric field intensity distributions on a surface of the aircraft, wherein the electric field intensity distributions are expected to be obtained when the aircraft receives external electric fields having electric field directions different from each other, wherein each electric field intensity distribution includes reference electric field intensities at m positions on the aircraft, and wherein m is an integer;
a data extracting unit configured to extract one of the electric field intensity distributions from the electric field distribution table on a basis of surface electric field intensities at n positions on the aircraft, wherein the surface electric field intensities are detected by electric field sensors disposed at the n positions on the aircraft;
an electric field intensity calculator configured to calculate surface electric field intensities at the m positions on a basis of the extracted one of the electric field intensity distributions; and
an attitude control unit configured to perform prevention operation of the aircraft on a basis of the calculated surface electric field intensities at the m positions.

6. An aircraft comprising:
a fuselage;
a main wing attached to the fuselage and configured to generate lift that acts on the aircraft;
a storage that holds an electric field distribution table including electric field intensity distributions on a surface of the aircraft, wherein the electric field intensity distributions are expected to be obtained when the aircraft receives external electric fields having electric field directions different from each other, wherein each electric field intensity distribution includes reference electric field intensities at m positions on the aircraft, and wherein m is an integer;
electric field sensors disposed at n positions on the aircraft, and configured to detect surface electric field intensities at the n positions on the aircraft, wherein n is an integer that is less than m, and wherein the n positions at which the respective electric field sensors are disposed are arranged at, or adjacent to, n of the m positions, respectively; and
circuitry configured to:
  extract one of the electric field intensity distributions from the electric field distribution table on a basis of the detected surface electric field intensities at the n positions on the aircraft;
  calculate surface electric field intensities at the m positions on a basis of the extracted one of the electric field intensity distributions; and
  perform prevention operation of the aircraft on a basis of the calculated surface electric field intensities at the m positions.

7. A flight controller for aircraft, the flight controller comprising:
a storage that holds an electric field distribution table including electric field intensity distributions on a surface of the aircraft, wherein the electric field intensity distributions are expected to be obtained when the aircraft receives external electric fields having electric field directions different from each other, wherein each electric field intensity distribution includes reference electric field intensities at m positions on the aircraft, and wherein m is an integer; and
circuitry configured to:
  extract one of the electric field intensity distributions from the electric field distribution table on a basis of surface electric field intensities at n positions on the aircraft, wherein the surface electric field intensities are detected by electric field sensors disposed at the n positions on the aircraft;
  calculate surface electric field intensities at the m positions on a basis of the extracted one of the electric field intensity distributions; and
  perform prevention operation of the aircraft on a basis of the calculated surface electric field intensities at the m positions.

* * * * *